United States Patent [19]

Ohta et al.

[11] Patent Number: 4,585,689

[45] Date of Patent: Apr. 29, 1986

[54] TRANSPARENT CONDUCTIVE OPTICAL DEVICE AND A PROCESS FOR THE PRODUCTION THEREOF

[75] Inventors: Tatsuo Ohta; Katsuaki Komatsu, both of Hino, Japan

[73] Assignee: Konishiroku Photo Industry Co., Ltd., Tokyo, Japan

[21] Appl. No.: 658,599

[22] Filed: Oct. 9, 1984

[30] Foreign Application Priority Data

Oct. 8, 1983 [JP] Japan ............................... 58-188835

[51] Int. Cl.$^{4}$ .......................... B32B 7/02; B05D 5/06; B05D 5/12

[52] U.S. Cl. .................................... 428/216; 427/109; 427/164; 427/166; 428/697; 428/702

[58] Field of Search ....................... 427/109, 164, 166; 428/697, 702, 216

[56] References Cited

U.S. PATENT DOCUMENTS 4,277,517 7/1981 Smith ............................. 427/109 X 4,345,000 8/1982 Kawazog et al. ............. 427/109 X

*Primary Examiner*—James R. Hoffman

*Attorney, Agent, or Firm*—Jordan B. Bierman

[57] ABSTRACT

A transparent conductive optical device comprising a transparent conductive layer of a metal oxide on a substrate wherein the degree of oxidation of the transparent conductive layer is differentiated depending on the proximity to the substrate so that the degree of oxidation adjacent to the substrate is higher than the rest of the layer.

9 Claims, 18 Drawing Figures

TRANSPARENT CONDUCTIVE OPTICAL DEVICE AND A PROCESS FOR THE PRODUCTION THEREOF

This application claims the priority of Japanese Application No. 188835/83, filed Oct. 8, 1983.

FIELD OF THE INVENTION

The present invention relates to a transparent conductive optical device wherein a transparent conductive layer is provided on a substrate and a process for producing such device, for example, a transparent conductive film suitable for a liquid crystal display and a transparent finger touch input device and a process for producing such film.

BACKGROUND OF THE INVENTION

A transparent conductive film which comprises a transparent conductive layer of the $In_2O_3$ or ITO (indium tin oxide) series provided on a polymer sheet has heretofore been known. For example, in Lain-open Japanese Patent Publication No. 28214/1978, a transparent conductive film wherein, as shown in FIG. 1, an $Al_2O_3$ or $CeF_3$ layer 2, an $SiO_2$ or SiO layer 3, an $In_2O_3$ layer 4, an $SiO_2$ or SiO layer 5 and an $MgF_2$ layer 6 are successively laminated on one surface of a transparent resin sheet substrate 1 is disclosed wherein layers 2, 3 and 5, 6 constitute a multi-layered anti-reflection layer. In this case, layers 2, 3 are said to have additional effects of contributing to advancement of film adhesion and stabilization of electrical characteristics of the $In_2O_3$ layer 4.

However, since this known transparent conductive film has the aforesaid respective films 2, 3, 5, 6 consisting of different components laminated above and below the transparent conductive film 4 for enhancing the anti-reflection effect, upon forming these respective layers by a vapor deposition process; it has been necessary that a number of an evaporation sources are required, that the structure of a deposition device becomes complicated and that deposition conditions have to be controlled individually. In addition, when a plurality of different materials are used for deposition in a common vessel, different kinds of substance adhere to the wall surface of the vessel, that are liable to re-evaporate or peel resulting in the contamination of the evaporation source at the time of the subsequent deposition. Thus, it is not possible to avoid contamination of the evaporation vessel and deterioration of the properties of a film thus formed. Further, adhesion between these layers for reducing reflection being different in many cases, it is difficult to maintain satisfactory adhesion between the respective layers. Moreover, even if adhesion between these films as an anti-rubbing performance of the film was improved to some extent by the aforesaid respective films 2, 3, 5, 6, it has been found that the anti-bending performance of the film was inferior and in fact, a bending test was liable to cause a crack and break the conductive layer and, therefore, change the sheet resistance remarkably.

On the other hand, as shown in FIG. 2, in Laid-open Japanese Patent Publication No. 128798/1978, a transparent conductive film is disclosed which is obtained by forming a titanium oxide layer 7 on a substrate 1 by coating an alkyl titanate solution and forming thereon, a thin metal film 8 to form a transparent conductive film. However, the aforesaid drawbacks of the conventional transparent conductive film can hardly be eliminated in this case, too.

SUMMARY OF THE INVENTION

An object of the present invention is to provide a transparent conductive optical device which can be simply produced at a low cost and which has excellent film properties, film adhesion and film strength, and a process for producing such device.

Namely, the present invention relates to a transparent conductive optical device which comprises a transparent conductive metal oxide layer on a substrate, characterized in that the said transparent conductive layer is differentiated in degree of oxidation depending on the proximity to the said substrate and the degree of oxidation of a part of the said transparent conductive layer that is contiguous or adjacent to the said substrate is made higher than that of the remaining part of the said transparent conductive layer.

The characteristics of the present invention resides in changing the degree of oxidation within the transparent conductive layer such that the degree of oxidation of said transparent conductive layer contiguous or adjacent to the said substrate is made higher than that of the other part thereof. In other words, as will be mentioned in detail later, by raising the degree of oxidation, the said metal oxide not only improves light transmittance, but also sharply improves adhesion to the said substrate. By this, the mechanical strength and reliability of a transparent conductive optical device would remarkably advance, and at the same time, such remarkable effect being obtainable by changing degree of oxidation in a single transparent conductive layer, production of the optical device per se is simplified, and in addition, the film properties can be improved as well.

Again, as a method of obtaining such transparent conductive optical device at a good reproducibility, the present invention provides a process for producing such transparent conductive optical device which comprises forming a transparent conductive layer onto a substrate while supplying an oixidizing gas, wherein the concentration of the oxidizing gas is made relatively high at a part which is contiguous or adjacent to the said substrate.

According to this process, it is possible to differentiate the degree of oxidation by merely changing the concentration of the said oxidizing gas while the said metal oxide is being deposited. In the present invention the term "film" is used in terms of the thickness and planar configuration and this includes sheet, tape and any other like-materials.

BRIEF DESCRIPTION OF THE DRAWINGS

FIG. 3–FIG. 18 show embodiments of the present invention, in which:

FIG. 3 is, a partial section of a transparent conductive film according to the present invention.

FIG. 4 is a graph showing relation between degree of oxidation and sheet resistance of a transparent conductive layer according to the present invention.

FIG. 5 is a graph showing rubbing resisting performance depending on the said degree of oxidation.

FIG. 6 is a spectral map according to the ESCA analysis of a transparent conductive layer according to the present invention.

FIG. 7 is a diagram showing distribution of concentration of oxygen in a transparent conductive film according to the present invention.

FIG. 8 is a diagram showing distribution of concentration of oxygen in another transparent conductive layer according to the present invention.

FIG. 9 is a graph showing the rubbing resisting performance of the transparent conductive film shown in FIG. 8.

FIG. 10 and FIG. 11 are schematic sections of two embodiments of an apparatus for producing a transparent conductive film according to the present invention.

FIG. 12 is a perspective view of a high frequency gas discharge divice.

FIG. 13 and FIG. 15 are partial sections of two other embodiments of a transparent conductive film according to the present invention.

FIG. 14 is a graph showing spectral reflective ratio of a transparent conductive film attached with a reflection reducing film.

FIG. 16 is a graph showing change of light transmittance with change of wavelength of a transparent conductive film according to the present invention.

FIG. 17 is a section of a finger touch input device.

FIG. 18 is a section of a liquid crystal display.

Figure 1:
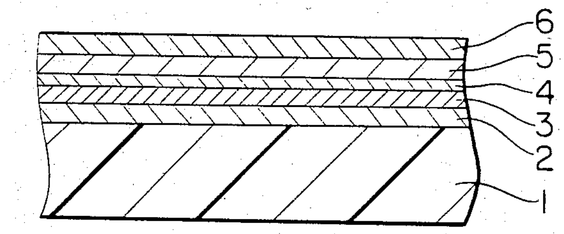
FIG. 1 and FIG. 2 are partial sections of two conventional transparent conductive films.
Figure 2:
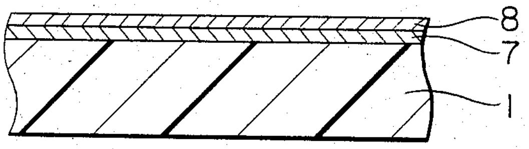

In the foregoing drawings, the following reference numerals stand for what follows:

1—Light transmissive substrate
11—Gas discharge/device
14—Transparent conductive layer
14a—Lower layer part of 14 high in degree of oxidation
14b—Upper layer part of 14 low in degree of oxidation
22—Evaporation source
28,78—Transparent conductive film.

EMBODIMENTS

Hereinbelow, the present invention will be explained in detail by way of embodiments.

Figure 3:
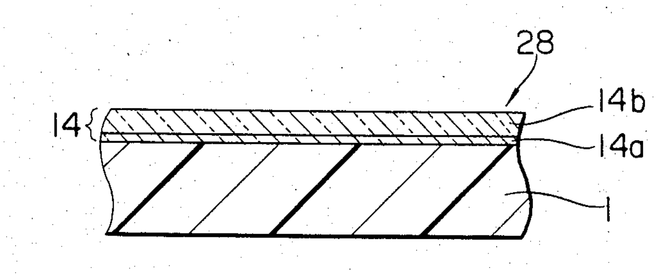

FIG. 3 shows a basic structure of a transparent conductive film 28 according to the present invention. This film has a conventional polymer sheet as a substrate 1, on which is provided a transparent conductive layer 14 consisting of a metal oxide (for example, indium oxide or tin oxide or a mixture of indium oxide and tin oxide or tin (ITO, etc.) or a mixture of tin oxide and cadmium or cadmium oxide).

It should be noted that in this Example said transparent conductive layer 14 consists of a single metal oxide, but the degree of oxidation of a part 14a of the said layer 14 that is in contact with or adjacent to the said substrate is made higher than that of the other part 14b of the said layer 14.

Next, the characteristic advantages brought about by differentiating the degree of oxidation will be explained based on the experimental results.

Figure 4:
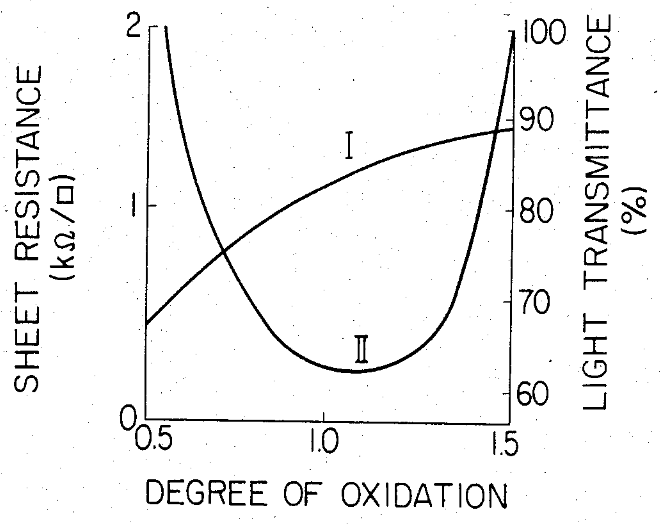

For example, in the case of an ITO film (film thickness 700 Å, Sn content 5 wt. %), change of the sheet resistance and of light transmittance due to the degree of oxidation has become as shown in FIG. 4. This degree of oxidation was measured while etching the film by the ESCA analysis. As the degree of oxidation increased, the sheet resistance tended to rise (Curve I), on the other hand, the light transmittance (under irradiation of light having a wavelength of 550mu) suddenly rose at the degree of oxidation in the vicinity of 1.3 (Curve II). When the primary components of ITO are indicated as $In_{x1}Sn_{x2}Oy$, the aforesaid degree of oxidation becomes $y/x1+x2$.

Figure 5:
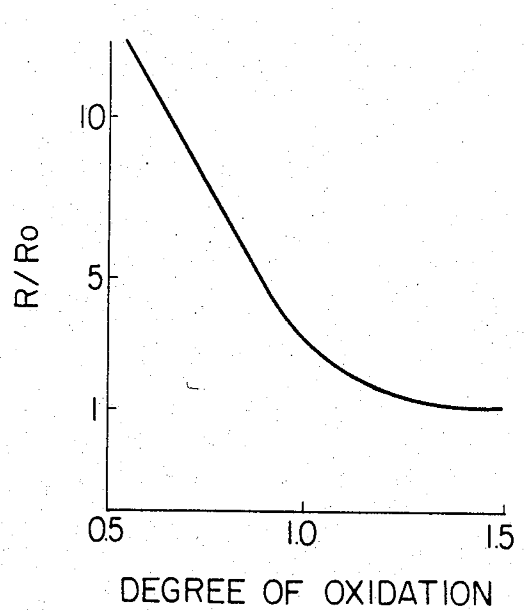
Figure 6:
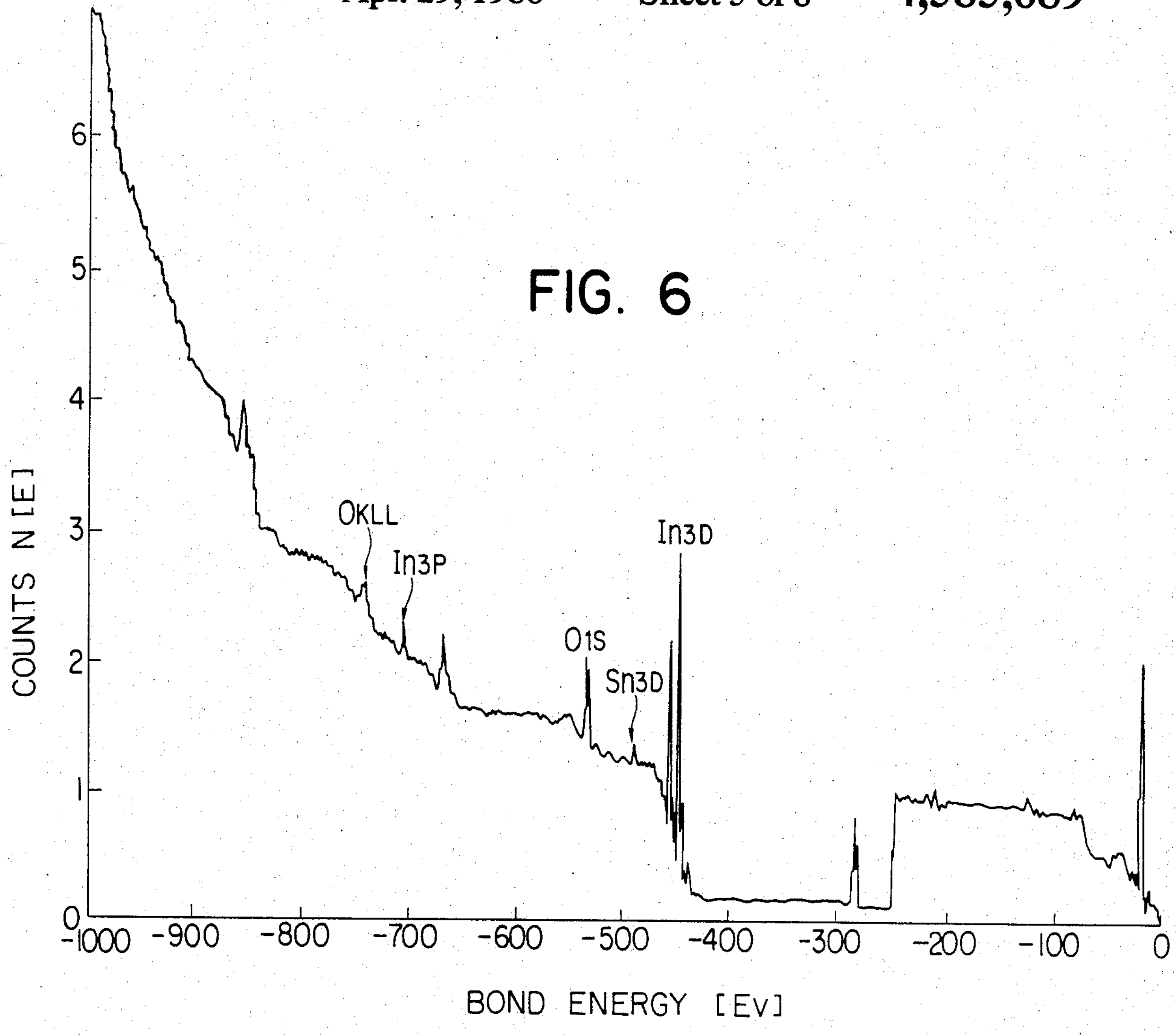

Relation between the degree of oxidation and adhesion of the film to the substrate (polyethylene terephthalate) was scrutinized. Adhesion of the film to the substrate was evaluated by a rubbing resisting test with gauze. At the test, change of the sheet resistance $R/R_O$ ($R_O$ was the initial sheet resistance and R was the sheet resistance after the test) upon rubbing the film 100 times in reciprocation at a load of 100 kg/cm$^2$ was measured. The results are shown in FIG. 5. It is seen from FIG. 5 that as the degree of oxidation increased, change of the sheet resistance $R/R_O$ decreased and it is especially desirable that the degree of oxidation is in excess of 1.0. For information, the degree of oxidation was sought from the ESCA analysis as shown in FIG. 6. It is seen that the degree of oxidation calculated based on the peak ratio of $In_{3D}$ to $O_{1S}$ is 1.3–1.5 (by composition ratio $In_2O_{2.6-3.0}$). The specific experimental data are shown below, from which the degree of oxidation becomes the concentration ratio of $O_{1S}/In_{3D} \approx 1.3$.

(1) Concentration of In and O (ITO film)

The heights of the respective peaks were measured from the ESCA data, that were divided by adjusted values and the ratios of the obtained values of $In_{3D}$, $Sn_{3D}$ and $O_{1S}$ were made concentrations (at %) of In, Sn and O.

| | Peak value | Adjusted value | Peak value after adjustment | Concentration (at %) |
|---|---|---|---|---|
| $In_{3D}$ | 2.4 | 2.85 | 0.84 | 42 |
| $Sn_{3D}$ | 0.1 | 3.2 | 0.03 | 2 |
| $O_{1S}$ | 0.7 | 0.63 | 1.11 | 56 |

From the results shown above, it is seen that by increasing the degree of oxidation of the part 14a being in contact with the substrate 1 of the transparent conductive layer 14 of the transparent conductive film 28 shown in FIG. 3, it is possible to decrease change of the sheet resistance (advance the film adhesion) of the film per se while retaining pertinent values of the sheet resistance and light transmittance. In addition, because adhesion of the part 14a of the layer 14 to the substrate 1 is large, even when the film was bent, it was confirmed that no crack had occurred in the interface between the two. Especially, the fact that the degree of oxidation of the part 14a of the layer 14 is large means that the supplying amount (or concentration) of $O_2$ at the time the film is made, increases and the surface of the substrate 1 is liable to be activated by active oxygen, resulting in reinforcing the adhesion of the part 14a of the layer 14 to the substrate 1, and and structure of the part 14a of the film 14 becomes compact due to increase of oxygen atom, respectively. It is desirable to make the degree of oxidation of the part 14a of the layer 14, 1.4–1.5. On the other hand, it is recommendable to make the degree of oxidation of the other part 14b of the layer 14, 0.8–1.4 (preferably 1.0 -1.4).

The stratal structure of a transparent conductive film 28 as shown is as follows:

Substrate 1: Polyethylene terephthalate film or polyethylene-2,6-naphthalene dicarboxylate film or glass sheet Lower part 14a of the transparent conductive layer 14:
Degree of oxidation 1.4–1.5
Film thickness 50–150 Å

Upper part 14b of the transparent conductive layer 14:

Degree of oxidation 0.8–1.4

Film thickness 200–2000 Å.

Figure 7:
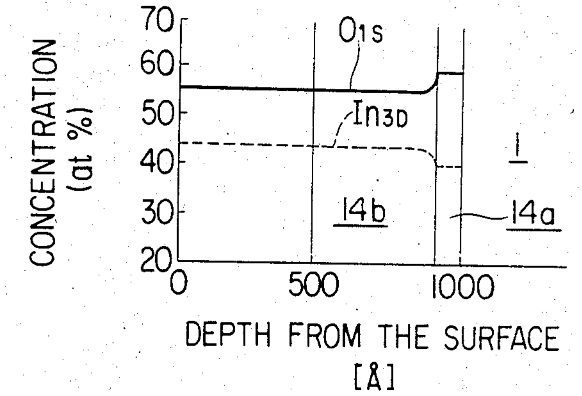

The concentration of oxygen ($O_{1S}$ in FIG. 6) in a direction of the thickness of the aforesaid transparent conductive layer is shown in FIG. 7, wherein the concentration of indium ($In_{3D}$) is shown by broken line.

The so constructed film exhibited very excellent film properties as shown below:

Sheet resistance: 1K Ω/□–100 Ω/□

Light transmittance: 85%–80% (under irradiation of light having a wavelength of 550mμ)

Rubbing resisting performance: $R/R_O=1.5$ (at a load of 100g/cm$^2$, the film was rubbed 100 times in reciprocation)

Bending resisting performance: $R'/R_O'$1.7 (sheet resistance before and after the bending test being named $R_O'$and $R'$).

In this example, when the lower part 14a of the layer 14 was made to have a film thickness of 100 Å and an In content of 40 at % (degree of oxidation 1.5) and the upper part 14b of the layer 14 was made to have a film thickness of 900 Å, an In content of 42 at % and an O content of 56 at % (degree of oxidation 1.3), the layer 14 had a sheet resistance of 200 Ω/□ and a light transmittance of 83%.

In the embodiment shown in FIG. 3, the degree of oxidation of the lower part 14a of the layer 14 was made constant, but it is possible to make the degree of oxidation of this part 1.5 on the surface of the substrate 1 and 1.3 in the interface with the upper part 14b of the layer 14 so as to continuously decrease the degree of oxidation from 1.5 to 1.3 between the two parts.

Figure 8:
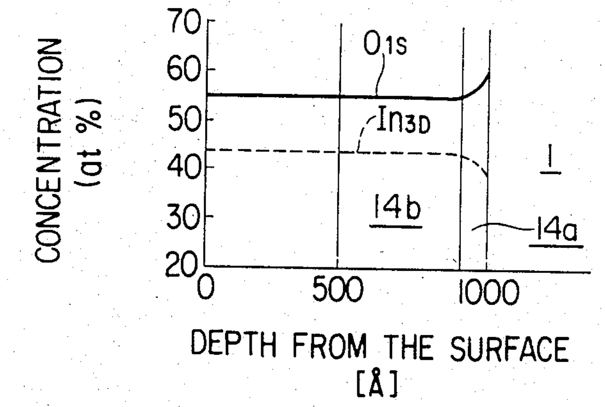

In FIG. 8, distribution of concentration of oxygen in the film layer of another embodiment is shown. In this case, the degree of oxidation of the upper part 14b of the layer 14 is equalized at 1.3 and with respect to the film thickness, that of the lower part 14a of the layer 14 is made 100 Å and that of the upper part 14b is made 200–2000 Å. When the film thickness of the upper part 14b is made, for example, 900 Å, the film had a sheet resistance of 220 Ω/□ and a light transmittance of 83%.

Figure 9:
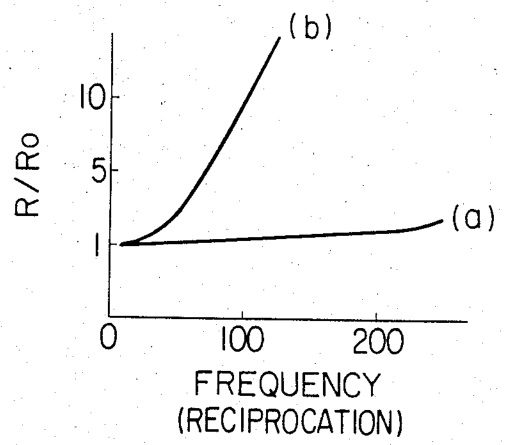

As such, even if the degree of oxidation of the lower part 14a of the transparent conductive layer 14 on the side of the substrate 1 is continuously changed in the direction of thickness, the film exhibits excellent sheet resistance, light transmittance, rubbing resisting performance and bending resisting performance. With reference to the rubbing resisting performance, excellent results as shown by curve in FIG. 9 were obtained. Curve B in FIG. 9 shows data of the case wherein the said lower part 14a has not been provided. It is seen that the rubbing resisting performance remarkably deteriorates in this case.

As the material of the substrate 1 of the said film 28, a thermoplastic resin such as polyester resin, polycarbonate resin, polyamide resin, acryl resin, ABS resin, polyamideimide resin, styrene resin, polyacetal resin and polyolefin resin; or a thermosetting resin such as epoxy resin, diallyl phthalate resin, silicone resin, unsaturated polyester resin, phenol resin, urea resin and melamine resin may be cited. Of these resins, polyester resin, especially polyethylene terephthalate film or polyethylene-2,6-naphthalene dicarboxylate film is preferable due to its excellent heat resistance, mechanical properties and light transmissive property.

Next, one example of a process for producing the said transparent conductive film will be explained with reference to FIG. 10.

A deposition apparatus used for the production is partitioned to chambers 30, 31, 32, in the chambers 32, 30 on the both sides, a take-up roll 16 and a feed roll 13 for the sheet substrate 1 are disposed and while the substrate 1 is successively forwarded between the two rolls, the substrate 1 is subjected to the following treatments. At first, in the chamber 30, the substrate 1 is preheated (at 60° C.) by a heater lamp 24 to remove the moisture adsorbed by the substrate 1, then the substrate 1 is treated with discharge by a discharge device 25 to clean the surface. Next, the substrate 1 entering the chamber 31 as a deposition vessel undergoes the following treatment while it is being forwarded by a carrier roller 26 (carrying speed 10 cm/min–2 m/min).

By a halogen heater lamp 20, an evaporation source 22 consisting of an In-Sn alloy or ITO (or two evaporation sources of In and Sn) is heated and evaporated and in addition, oxygen gas is introduced after being ionized or activated via a discharge device 11, by which an ITO transparent conductive film (the aforesaid 14) is deposited on one surface of the substrate 1. The conditions at the time of deposition are as follows.

Evaporation source 22: In-Sn alloy (resistance heating) or ITO (electron gun heating), deposition speed 200 Å/min–1000 Å/min Discharge device 11: Introducing oxygen gas at a rate of 10–60cc/min (degree of vacuum $5\times10^4$–Torr $9\times10^4$ Torr, 200–700 W DC or HF discharge).

The substrate 1 so deposited with the ITO film is introduced into the chamber 32, where the substrate 1 is successively taken up on the take-up roll 16 while it is measured of a light transmittance by a light transmissive sensor 18 and of an electrical resistance by an ohmmeter 17. The measured values of the light transmittance and the electrical resistance may be fed back to the preceding stage deposition conditions for controlling the heating temperature of the evaporation source, the introducing amount of the $O_2$ gas and the power for discharge by taking into account these values.

What is very important in the aforesaid process is that in the deposition chamber 31, the discharge device 11 is operated at an inclination of the predetermined angle to the direction in which the substrate 1 is carried. As a result, in the deosition chamber 31, in a zone A on the admission side and in a zone B on the withdrawal side, a difference is brought about in the amount of oxygen ion or active oxygen released from the discharge device 11 that reaches the substrate 1 (namely, concentration of oxygen). Namely, in the zone A, the concentration of oxygen becomes relatively high, whereas on the side of the zone B, the concentration of oxygen becomes relatively low. Due to this, the degree of oxidation of ITO deposited on the substrate 1 becomes high in the zone A and the lower part 14a of FIG. 3 is deposited, further, the said degree of oxidation becomes low on the side of the zone B and the upper part 14b of FIG. 3 is deposited. Actually, however, the concentration of oxygen has a distribution from the zone A through the zone B, the degree of oxidation of the lower part 14a that is deposited is within the range of 1.4–1.5, while that of the upper part 14b is within the range of 1.0–1.4.

According to this process, an ITO film with the objective degree of oxidation can be deposited by one step and, in addition, with the minimum number of the evaporation source. Accordingly, the apparatus for producing a transparent conductive optical device or film is simplified in respect of its structure and operability, at the same time, the ratio of impurities that mix in the film may be sharply decreased.

Figure 10:
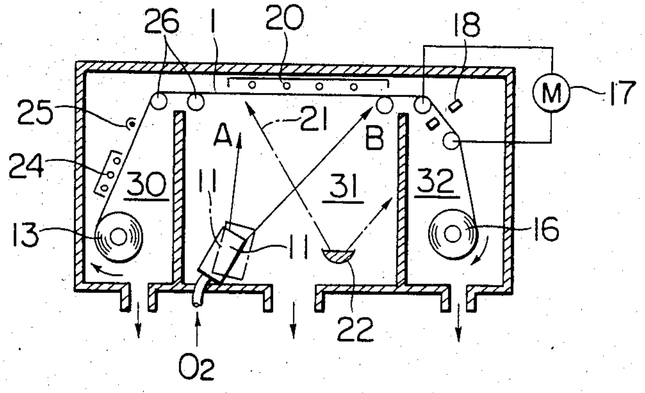

When it is intended to make sufficient the difference of concentration of oxygen of the zone A from that of the zone B, as shown by dashed line in FIG. 10, the discharge device 11 had better be so disposed as to be further oriented to the side of the zone A.

Figure 11:
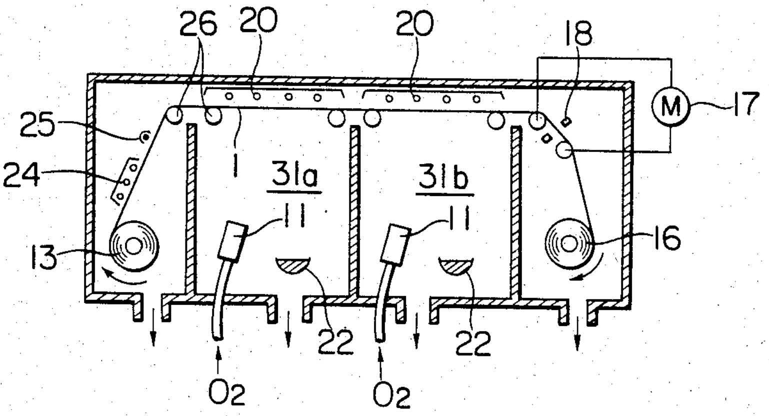

It is possible, as shown in FIG. 11, to devide the deposition chamber 31 to a chamber 31*a* and a chamber 31*b*, make large the amount of oxygen derived from the discharge device 11 in the chamber 31*a* and make small the amount of oxygen derived from the discharge device 11 in the chamber 31*b*. By so doing, on the substrate 1, at first ITO having a large degree of oxidation is deposited in the chamber 31*a*, on which deposit ITO having a small degree of oxidation is deposited in the chamber 31*b*. Number of the said deposition chamber and the amount of oxygen introduced may be varied in accordance with the object.

Again in FIG. 10, by selecting the position of the evaporation source 22, limiting the flying range of the evaporation material 21 accordingly and thereby making relatively small the concentration of vapor in the substrate admission area of the zone A, it is also possible to further raise the degree of oxidation (namely, the ratio of oxygen atom) of the metal oxide deposited in an area which is in contact with the substrate 1 and successively reduce the degree of oxidation of the metal oxide deposited on the said area.

Figure 12:
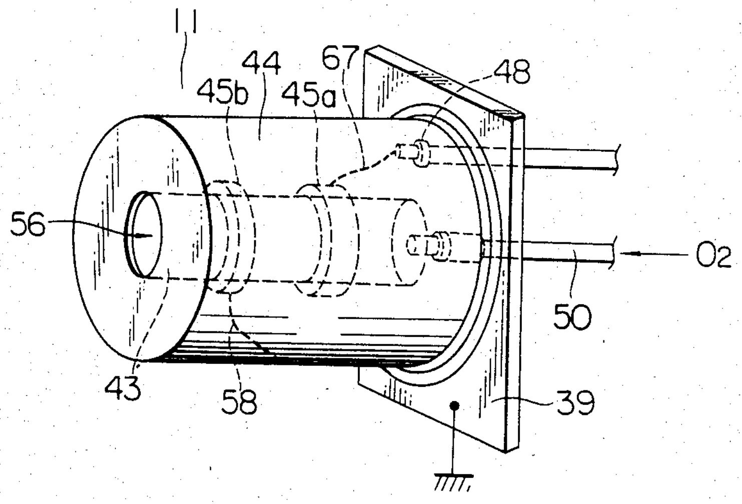

FIG. 12 shows in detail the gas discharge device 11 used for the aforesaid deposition. According to this discharge device, an electrode for discharge comprises a plurality of rings 45*a*, 45*b* that are so disposed as to connote the peripheral surface of an inlet tube 43, of which one ring-shaped electrode 45*a* is connected to a high frequency inlet terminal 48 by a lead wire 67 and another ring-shaped electrode 45*b* is connected to a metal protective member 44 by a lead wire 58. Each of the aforesaid electrodes 45*a*, 45*b* consists of, for example, a copper or stainless steel band ring having an inner diameter of 2–10 cm $\phi$ and a width of 0.5 –10 cm and bringing about C coupling type (capacity coupling type) discharge inside the inlet pipe 43. It is possible to wind water-cooled pipe around the said hand ring to cool the same. Oxygen gas is introduced from a gas inlet port 50 to the inlet pipe 43, where the gas is activated or ionized and supplied into the deposition chamber from the gas outlet 56.

FIG. 13–FIG. 16 illustrate the cases of providing a reflection reducing layer in the aforesaid transparent conductive film 28.

In general, in a reflection reducing film, unless the reflective index ($n_1$) of a first layer that comes into contact with air is smaller than the refractive index ($n_s$) of a substrate, it is not possible to obtain an optical interference effect at each reflecting surface. For example, in the case of a monolayer reflection reducting film, when $n_1 = n_0\sqrt{n_s}$($n_0$ is the refractive index of air), the reflective ratio becomes zero at a wavelength at the center.

In the case of an embodiment shown in FIG. 13, a reflection reducing layer 43 is comprised of silicon oxide and each of the respective constitutional layers 40, 41, 42 is formed in such a manner as shown in the following table.

| | Refractive index | Film thickness |
|---|---|---|
| First layer 40 | $n_1$ = 1.50–1.55 | λ/4 (0.125 μm) |
| Second layer 41 | $n_2$ = 1.75–1.83 | λ/4 (0.125 μm) |
| Third layer 42 | $n_3$ = 1.60–1.68 | λ/4 (0.125 μm) |
| Substrate 1 | $n_s$ = 1.49–1.60 | 100 μm |
| Transparent conductive layer 14 | $n_c$ = 2.0 (sheet resistance 200–500 Ω/□) | 500–1000Å |

Figure 13:
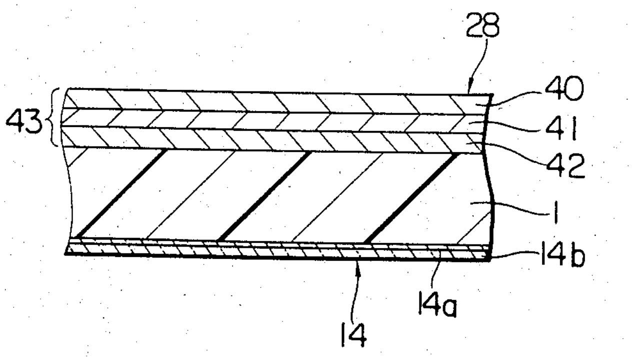

In the embodiment shown in FIG. 13, when the refractive index of the first layer 40 exceeds 1.55, its difference from the refractive index of the second layer 41 becomes small and the reflective ratio of the visible zone as a whole becomes high. And when the refractive index of the second layer 41 is less than 1.75, the reflective ratio of especially the central portion of the visible zone becomes high, and when it exceeds 1.83, absorption of light by a silicon oxide film becomes large. Again, when the reflective index of the third layer 42 exceeds 1.68, the reflective ratio of the central portion of the visible zone becomes high and when it is less than 1.60, the reflective ratio of the periphery of the visible zone becomes high. All of these are not preferable from the viewpoint of the practical use.

Figure 14:
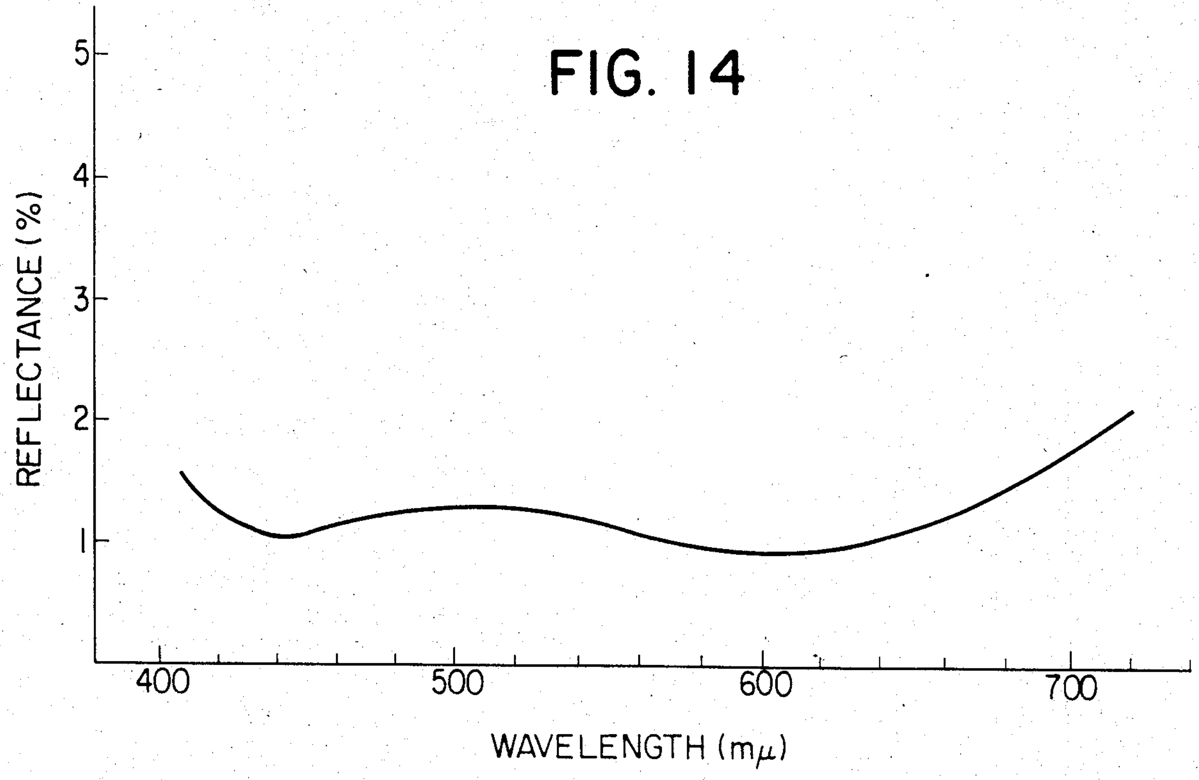

FIG. 14 shows the spectral reflective ratio of a film wherein the reflective ratios of the first layer 40, the second layer 41 and the third layer 42 are made 1.50, 1.8 and 1.68, respectively, polyethylene terephthalate (100μm, thick) is used as the substrate 1 and an ITO (mixture of indium oxide and tin) layer is produced by the aforesaid apparatus as the transparent conductive layer 14 (ITO has a film thickness of 600 Å and a sheet resistance of 400 Ω/□). It may be seen from FIG. 14 that the aforesaid film has a high reflection reducing effect throughout its visible zone and the reflective ratio on the side of the transparent conductive layer 14 becomes about 1.5%, being small to light having a wavelength of 550 mμ due to the reduced back reflection on the side of the silicon oxide layer 43 and data the same as those shown in FIG. 14 are observed.

A transparent conductive film according to the embodiment shown in FIG. 13 is of a type which is used so that in the case of incidence, light comes mainly from the side of the reflection reducing layer 43. In this case, between the first silicon oxide-deposited layer 40 and the substrate 1, the second silicon oxide-deposited layer 41 having a refractive index higher than that of the first layer 40 and satisfying the aforesaid optical interference condition is provided, and under this second layer 41 is further provided the third silicon oxide-deposited layer 42 having a relatively high reflective index. Therefore, it is possible to obtain a film having an adequate reflection reducing effect. Because the respective deposited layers 42, 41, 40 may be deposited in this order as the same components by merely changing their deposition conditions (for example, oxygen gas pressure, etc.), the production becomes simple and at a low cost, moreover, adhesion of the films between the respective layers is sufficient and there being no foreign materials mixing in these films, the film properties become very excellent.

Figure 15:
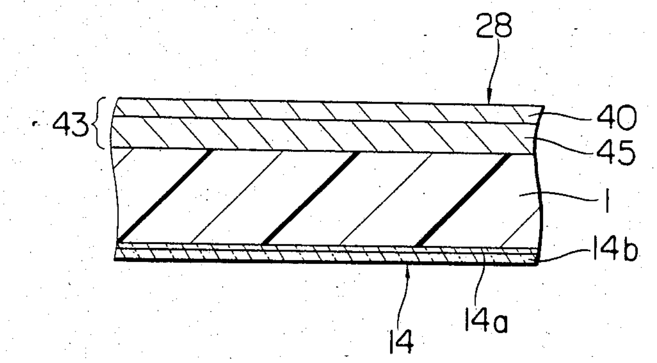

Next, in the case of a transparent conductive film 28 shown in FIG. 15, between a first silicon oxide-deposited layer 40 and a substrate 1, a second silicon oxide-deposited layer 45 whose refractive index becomes continuously higher in a direction of the thickness from the side of the substrate 1 to the side of the first layer 40 is provided at a thickness of $\lambda/2$.

The structure of this film 28 shown in FIG. 15 will be elaborately tabulated below to facilitate understanding.

| | Refractive index | Film thickness |
|---|---|---|
| First layer 40 | $n_l$ = 1.50–1.55 | $\lambda/4$ |
| Second layer 45 | (Upper part): 1.80–1.85 (Lower part): 1.60–1.68 | $\mu/2$ |
| Substrate 1 | $n_s$ = 1.49–1.60 | 100 μm |
| Transparent conductive layer 14 | $n_c$ = 2.0 (sheet resistance 200–500Ω/□) | 500–1000Å |

In this embodiment, the refractive index of the second layer 45 changes in such a way that the index become continuously higher from the side of the substrate to the side of the first layer 40, or it is a so-called non-homogeneous film.

The ranges of the refractive indices of the respective layers are limited from the same reason as in the said embodiment shown in FIG. 13, but as to the upper limit of the refractive index of the second layer 45, since the thickness of that layer becomes substantially very small, the upper limit is up to a range where absorption is somewhat larger than in the embodiment shown in FIG. 13.

In the aforesaid embodiments shown in FIG. 13 and FIG. 15, even if, for example, the second layer 41 and the third layer 42 of the embodiment shown in FIG. 13 are further divided in a direction of the thickness into a plurality of layers whose refractive indices are successively changed, the obtained effect is not substantially different from the effects of the aforesaid two embodiments and a transparent conductive film sheet having the same reflection reducing effect, a low sheet resistance (less than 500 Ω/□) and a reflective ratio of 1–2% exclusive (wavelength 5500 Å) is obtained. Again, the reflective ratio on the side of the transparent conductive layer 14 is small the same as in the embodiment shown in FIG. 13.

Figure 16:
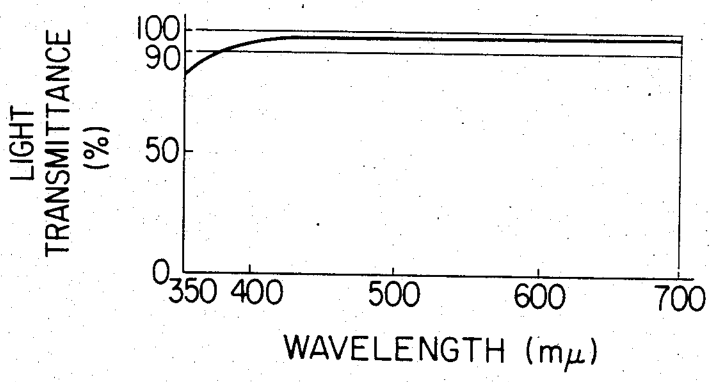

FIG. 16 shows change of light transmittance with change of wavelength of a film according to the embodiment shown in FIG. 13 or FIG. 15, from FIG. 16, it is seen that the reflection reducing effect becomes high in a wide wavelength range and at a wavelength of 550 mμ, a light transmittance of 97% is obtained.

For changing continuously or stepwise the refractive index of a silicon oxide-deposited layer as mentioned above, suffices it to change the deposition conditions continuously or stepwise during the deposition.

As explanined so far, each of the transparent conductive films according to the embodiments shown in FIG. 13–FIG. 16 uses films deposited with silicon oxide only, forming substantially multilayer films to obtain the high reflection reducing effect, moreover, the refractive index of each of these layers is changeable by merely changing the deposition speed or the pressure of ambient oxygen gas. Therefore, it is very easy to control the refractive index. In addition, the transparent conductive film according to each of these embodiments may use an ordinary resistance heating device as the evaporation source. As such, these transparent conductive films have very high values of the practical use.

The transparent conductive film 28 according to these embodiments (for example, the embodiment shown in FIG. 13) is very effective when it is fitted, for example, on a display scope of a transparent sensitive screen finger touch input device for use.

Figure 17:
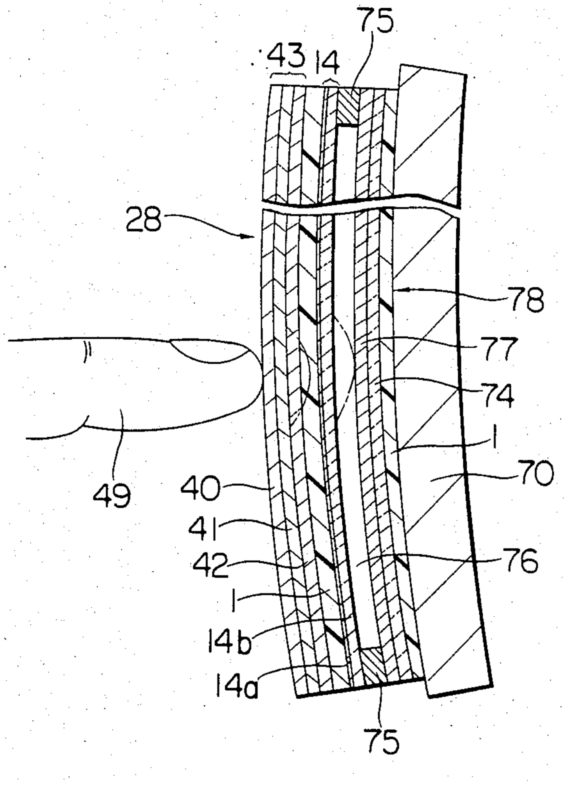

An input device of this kind does not use a keyboard, but by merely touching the predetermined position of the display scope by a finger tip, it is possible to input data per se. Because of this, as input/output terminal equipment of a computer, in contrast to the conventional binary equipment consisting of an indicator section (display surface) and an input section (keyboard), the operation will be remarkably simplified. In such an input device, as an enlarged view is shown in FIG. 17, the aforesaid transparent conductive film 28 is fitted on the front surface of a display scope (or front panel) 70 in such a way that its reflection reducing layer 43 comes to the outside, on the other hand, another transparent conductive film 78 is directly fitted on the front surface of the front panel 70, the two films 28 and 78 are integrated via a peripheral gasket (or spacer) 75, but a certain gap 76 is reserved between the two films. In this case, as the said film 78, as has been known, what comprises laminating a transparent conductive film (ITO film) 74 and a reflection reducing layer 77 on a high polymer sheet substrate 1 may be used. And in the two opposite films 28, 78, the respective conductive films 14, 74 are orthogonally crossed with each other and disposed in the stripe pattern, respectively to constitute a group of matrix switches. This matrix switch being known per se, the detailed explanation is omitted.

Accordingly, as shown in FIG. 17, when the desired position on the surface of the film 28 is pushed by a finger tip 49, the film 28 is elastically deformed till it comes into contact with the other film 78 as shown by dashed line, at this time, at the intersection of the matrices, the two conductive layers 14, 74 are coupled in conductive current (electrostatically coupled), a conductive current flows from one to another and an output corresponding to this is obtained, enabling such operation as mentioned above to be started. Incidentally, in the said film 78, the reflection reducing film 77 is not necessarily required, but the system of a direct contact of the two conductive layers 14, 74 may be adopted in that stead. Or else, another alternative may also be adopted wherein the film 78 is not made a conductive film, but may be made a mere resistance sheet and change of capacity between the two films or a voltage value at the point of contact of these films may be taken out as an output.

At any rate, because it is an input device by the touch of finger tip 49, ordinarily an influence due to soil adhered to the surface of the substrate is liable to be brought about, but in the case of the embodiment shown in FIG. 17, such influence can be effectively prevented by the existence of the reflection reducing layer 43. Especially, when used in a bright room, because reflection of light on the surface of the film 28 is decreased remarkably by the reflection reducing layer 43, a displayed image on the display scope can be clearly seen with the eye and said soil comes to be hardly noticed.

Figure 18:
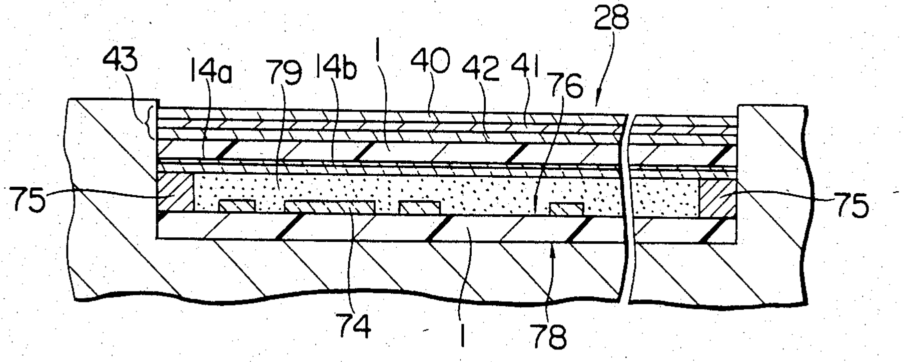

Combination of the two films as shown in FIG. 17 is also applicable as a liquid crystal display. Namely, as shown in FIG. 18, it is possible to arrange one conductive film of the respective conductive layers 14, 74 of the films 28, 78 (for example, on the side of the film 78) in a seven-segment pattern and seal a liquid crystal 79 in a gap 76 between the two films, impress voltage in times series on the electrode in a seven-segment shape by the known way to thereby have the predetermined digital display indicated. But, in the case of a twistmatic-type display, an oriented film and a polarized film are required. In this case also, because reflection on the surface side (namely, the side of visual observation) of the film 28 is adequately reduced by the reflection reducing layer 43, a clear digital pattern may be displayed.

These embodiments mentioned so far are further alterable based on the technical concept of the present invention.

For example, the material of the transparent conductive layer 14, distribution of concentration of oxygen and, further, a process for producing a film (a sputtering process is applicable also) may be altered in various ways. As to number of the interface where change of the refractive index occurs in the said reflection reducing layer, at least one would suffice. When change of the refractive index is continuous, it is practically permissible to constitute a reflection reducing layer with substantially one layer only and the refractive index may be changed continuously within such one layer also. The reflection reducing layer may consist of, aside from the material mentioned above, magnesium fluoride and cerium fluoride, etc. The material of the transparent conductive layer is not limited to ITO only, but it may be indium oxide and tin oxide as well.

Furthermore, the aforesaid transparent conductive film may also be applicable to other optical devices.

We claim:

1. A transparent conductive optical device which comprises a transparent conductive layer of a metal oxide provided on a substrate, characterized in that the degree of oxidation of said transparent conductive layer is differentiated depending on the proximity to said substrate such that the degree of oxidation of said transparent conductive layer adjacent to said substrate is made higher than that of the remaining part thereof.

2. The transparent conductive optical device according to claim 1, wherein said metal oxide is selected from the group consisting of indium oxide, tin oxide, cadmium oxide, tin-cadmium oxide and indium-tin oxide.

3. The transparent conductive optical device according to claim 2, wherein said transparent conductive layer comprises the following layers from the side of said substrate;

(a) a first layer having a degree of oxidation of 1.3 to 1.5 and a film thickness of 50 to 150 A, and (b) a second layer having a degree of oxidation of 0.8 to 1.3 and a film thickness of 200 to 2000 A (wherein the degree of oxidation is defined as y/x when said metal oxide is shown as $M_xO_y$).

4. The transparent conductive optical device according to claim 1, wherein said metal oxide is indium-tin oxide.

5. The transparent conductive optical device according to claim 4, wherein said transparent conductive layer comprises the following layers from the side of said substrate;

(a) a first layer having a degree of oxidation of 1.4 to 1.5 and a film thickness of 50 to 150 A, and (b) a second layer having a degree of oxidation of 0.8 to 1.4 and a film thickness of 200 to 2000 A provided that degree of oxidation is defined as $y/x1+x2$ when said indium tin oxide is shown as $In_{x1}Sn_{x2}O_y$.

6. The transparent conductive optical device according to claim 1, wherein said transparent conductive layer comprises a stratal structure having different degree of oxidation.

7. The transparent conductive optical device according to claim 1, wherein said device comprises a reflection reducing layer on the opposite side of said substrate to said transparent conductive layer.

8. The device of claim 1 wherein the degree of oxidation continuously diminishes from said substrate to the part of said layer most remote from said substrate.

9. In a process for producing a transparent conductive device comprising providing a transparent conductive layer of metal oxide on a substrate, the improvement which comprises depositing a constituent of said layer on said substrate in the presence of an oxidizing gas whereby said constituent is a metal oxide, the concentration of said oxidizing gas being higher during the deposition contiguous and adjacent to said substrate and said concentration being lower during deposition more remote from said substrate.

* * * * *